United States Patent [19]

Kuwabara

[11] Patent Number: 4,709,417
[45] Date of Patent: Nov. 24, 1987

[54] OPTICAL MODULATION SYSTEM

[75] Inventor: Shinichiro Kuwabara, Kanagawa, Japan

[73] Assignee: Sony Corporation, Tokyo, Japan

[21] Appl. No.: 811,820

[22] Filed: Dec. 20, 1985

[30] Foreign Application Priority Data

Dec. 21, 1984 [JP] Japan ............................. 59-270488

[51] Int. Cl.$^4$ ............................................. H04B 9/00
[52] U.S. Cl. ..................................... 455/611; 369/116; 372/26; 372/32
[58] Field of Search ............... 369/106, 107, 116, 121; 455/611, 616, 618; 372/12, 26, 27, 28, 29, 32, 33; 332/7.51; 350/355, 356; 358/342, 347

[56] References Cited

U.S. PATENT DOCUMENTS 3,471,803 10/1969 Forster .................................. 372/32
3,713,042 1/1973 Kinsel .................................... 372/32

Primary Examiner—Joseph A. Orsino
Attorney, Agent, or Firm—Hill, Van Santen, Steadman & Simpson

[57] ABSTRACT

An optical modulation system is disclosed, which comprises an electro-optic modulator for modulating a laser beam according to a modulation signal, a photoelectric transducing means for transducing the output light of the electro-optic modulator into an electrical signal, a control circuit capable of switching of the polarity of a voltage applied to the modulator, an oscillator for supplying a reference oscillation signal to the control circuit, and a phase synchronizing detector for synchronously detecting the output signal of the photo-electric transducing means.

4 Claims, 2 Drawing Figures

OPTICAL MODULATION SYSTEM

BACKGROUND OF THE INVENTION

1. Field of the Invention

This invention relates to an optical modulation system used for, for instance, an optical disc cutting apparatus for recording video or audio or data either alone or in combination on an optical video or audio disc or an optical data disc where data is stored.

2. Description of the Prior Art

A so-called optical system is usually used for recording a signal on a video disc or a digital audio disc. This system uses as a recording medium a glass or like disc with a thin and uniform coating of a photoresist (photochemical reacting agent). A laser beam modulated according to a recording signal in an optic modulator is given as a spot having a very small diameter to the photoresist to thereby record a signal through sensitization of the photoresist. Subsequently, the disc is developed.

In a usual optical disc cutting apparatus, a laser beam $L_o$ provided from a laser beam source is supplied to an optic modulator for modulation according to a recording signal, and the modulated light beam is supplied through a beam splitter or like optical system and then an objective lens or like lens system to be supplied as a spot having a very small diameter to the disc rotated from a motor or the like, whereby the signal is recorded on the disc, as disclosed in U.S. Pat. No. 4,225,873.

As the optic modulator, there is an electro-optic modulator disclosed in the Bell System Technical Journal, vol. 50, No. 8, Oct. 1971 "Optical Modulation at High Information Rates" by G. White, in which the refractive index of a crystal is varied according to an electric field applied thereto. Another modulator is disclosed in Proceedings of the IEEE, vol. 54, No. 10, Oct. 1966 "A Television Display Using Acoustic Deflector and Modulation of Coherent Light" by A. Korpel et al, which is a so-called acoust-optic modulator in which the refractive index of a medium is varied according to an acoustic sound wave. In these modulators, the light output has a characteristic of the square of a sine wave with respect to the voltage applied to the medium. The electro-optic modulator has a broader modulation bandwidth than the acoust-optic modulator, and optical disc cutting apparatus employing the electro-optic modulators have been well known in the art.

When information signal is recorded on a disc or the like in such the optical disc cutting apparatus, the exposure level, i.e., the output light intensity of the optic modulator, has to be accurately controlled to a prescribed level according to the information signal in conformity to the photosensitive characteristic of the photoresist or a metal film.

Meanwhile, the characteristics of the electro-optic modulator are subject to variations under the influence of heat generated in a crystal. In the optical disc cutting apparatus employing the electro-optic modulator, therefore, the intensity of the modulated laser beam is instable with respect to a prescribed value. This drawback may be obviated by introducing a feedback control system as disclosed in the U.S. Pat. No. 4,225,873, noted above.

However, if the characteristic of the electro-optic modulator is varied beyond a range over which the control by the feedback control system is possible, the output light of the electro-optic modulator can no longer be stablized.

The light intensity versus applied voltage characteristic of the electro-optic modulator is varied according to the temperature. When the characteristic is varied greatly, the polarity of the applied voltage has to be switched in case when the light output is changed in the positive direction and in case when it is changed in the negative direction. Heretofore, this switching is done with a manual switch. This means that the handling of the optic modulator is rather cumbersome.

SUMMARY OF THE INVENTION

An object of the present invention is to provide an optical modulation system, in which the laser beam intensity can be controlled to a stable state at all time.

Another object of the present invention is to provide an optical modulation system, in which the cumbersomeness of manual switching of the polarity is improved through automatic switching of the polarity of voltage applied to an electro-optic modulator according to a light output characteristic.

A further object of the present invention is to provide an optical modulation system, which comprises an electro-optic modulator for modulating a laser beam in accordance with a modulation signal, photo-electric transducing means for transducing a modulated laser beam derived from said modulator to an electrical signal, an oscillator for generating an oscillation signal, a phase synchronizing detector supplied with said electrical signal and oscillation signal for detecting whether the phase of said electrical signal is in-phase or opposite phase with respect to the phase of said oscillation signal and a control circuit having first and second means, said first means being supplied with said oscillation signal and providing first modulation signal and second modulation signal having opposite phase with respect to said first modulation signal, said second means being controlled by an output derived from said phase synchronizing detector in such a manner that when the phase of electrical signal is opposite phase with respect to the phase of said oscillation signal, said first and second modulation signals being turned over and hence supplied to said modulator.

The above-mentioned and other objects and features of the invention will become apparent from the following detailed description taken in conjunction with the drawings which indicate an embodiment of the invention.

DESCRIPTION OF THE PREFERRED EMBODIMENT

Figure 1:
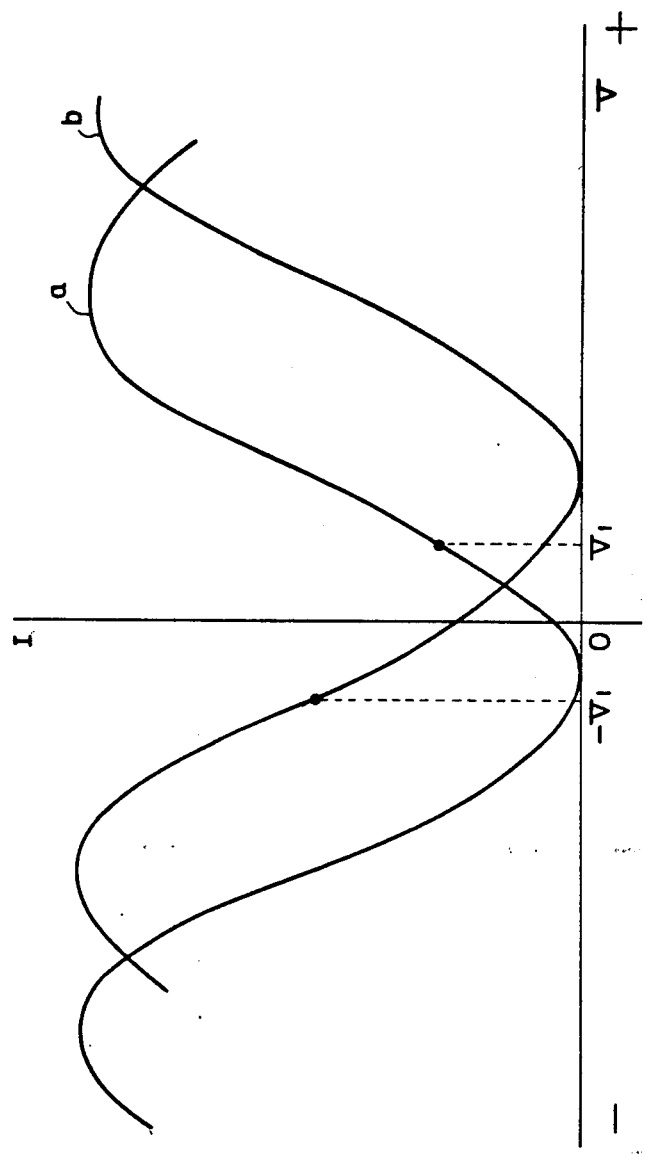
FIG. 1 is a graph showing a light intensity versus applied voltage characteristic of an electro-optic modulator used in an embodiment of the present invention.

Now, the light intensity versus applied voltage characteristic of an electro-optic modulator used in accordance with the present invention will be described. Generally, the electro-optic modulator has a characteristic that it produces light proportional to the square of a sine wave with respect to an applied voltage. As shown in FIG. 1, in a feedback control system where the normal operation is performed with respect to an operating point corresponding to a value $V_1$ of applied voltage V in a region of a characteristic curve a having a positive slope, the applied voltage V is reduced with increase of light intensity I and increased with reduction of the light intensity I. When the characteristic is changed to one as shown by curve b due to a temperature change or other causes, the characteristic curve b now has a negative slope at a point corresponding to the value $V_1$ of applied voltage V. In this case, light intensity stabilization control can not be obtained if the applied voltage V is reduced with increase of the light intensity I as in the case of the characteristic curve a.

In such a case, the operating point is shifted to $V = -V_1$ by inverting the polarity of the applied voltage V. If this is done so, the light intensity I can be stabilized through the operation of reducing the applied voltage V with increase of the light intensity I and increasing the applied voltage V with reduction of the light intensity I.

The present invention has been intended in the light of the above, and it seeks to facilitate the handling of the electro-optic modulator by permitting automatic switching of the polarities.

Figure 2:
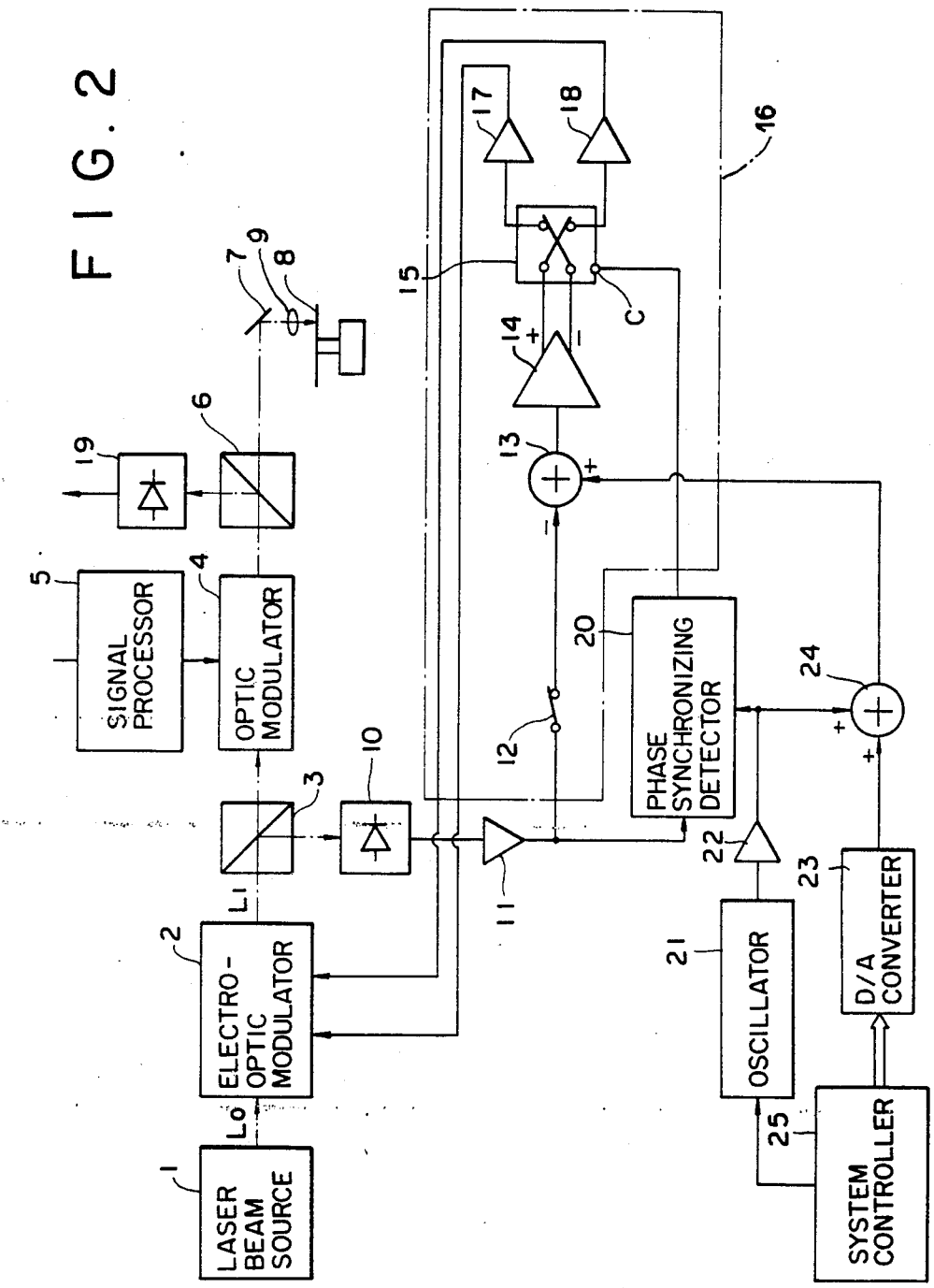
FIG. 2 is a schematic representation of an optical disc cutting apparatus employing an embodiment of the optic modulator according to the present invention.

FIG. 2 is a block diagram showing an optical disc cutting apparatus incorporating an embodiment of the optical modulation system according to the present invention. In this apparatus, the optical modulation system is used for setting the light intensity of a laser beam.

Referring to FIG. 2, a laser beam $L_o$ provided from a laser beam source 1 is modulated in an electro-optic modulator 2 according to a modulation signal provided from a control circuit 16, the modulated signal being supplied to a beam splitter 3. The laser beam that has passed through the beam splitter 3 is modulated in an optic modulator 4 according to a recording signal provided from a signal processor 5. Information to be recorded is supplied through an optical system including a beam splitter 6, a mirror 7 and a lens 9 as a beam spot having very small diameter on a recording medium 8. Reflected light from the beam splitter 6 is transduced by a photo-electric transducing means 19 into an electrical signal, which is utilized for such purposes as the monitoring of the recording signal.

Reflected light from the beam splitter 3 is led to a photo-electric transducing means 10 for transduction to an electrical signal. A detection signal obtained from the photo-electric transducing means 10 is supplied through an amplifier 11 to the control circuit 16 and a phase synchronizing detector 20.

The control circuit 16 includes a switch 12, an adder 13, an amplifier 14 which provides two signals of positive and negative polarities, a switch 15 and amplifiers 17 and 18. The outputs of the amplifiers 17 and 18 are supplied to the electro-optic modulator 2. That is, the electro-optic modulator 2 is controlled according to the differential voltage between the outputs of the amplifiers 17 and 18. The differential output voltage has a polarity which is inverted through control of the switch 15.

The phase synchronizing detector 20 synchronously detects a detection signal supplied from the amplifier 11 using an oscillation signal supplied from an oscillator 21 through an amplifier 22, and supplies a polarity switching control signal to a control terminal C of the switch 15 in the control circuit 16 according to the result of synchronous detection.

The oscillation signal is supplied through an adder 24 to the adder 13 in the control circuit 16.

The oscillator 21 is controlled by a system controller 25. The system controller 25 provides a laser beam intensity setting value as a digital signal to a digital-to-analog converter (hereinafter referred to as D/A converter) 23. The D/A converter 23 converts the input into an analog signal which is supplied through the adder 24 to the adder 13 in the control circuit 16.

The operation will now be described. When the switch 12 is opened, the system controller 25 operates the oscillator 21, while it provides value 0 to the D/A converter. At this time, the output of the adder 24 is the sole oscillation signal. The oscillation signal is supplied to the adder 13 in control circuit 16 and amplified in the amplifier 14 which provides in-phase and opposite phase outputs, which are supplied through the switch 15 and amplifiers 17 and 18 to the electro-optic modulator 2. An output light $L_1$ of the electro-optic modulator 2 having been modulated by the oscillation signal, is divided by the beam splitter 3. Transmitted light is led to the modulator 4, while reflected light is led to the photo-electric transducing means 10 for transduction to an electrical signal, whereby the signal at the oscillation frequency is detected. The detected signal is supplied through the amplifier 11 to the phase synchronizing detector 20 for synchronous detection using the oscillation signal supplied through the amplifier 22. Whether the phase of the detected signal is in-phase or opposite phase with respect to the phase of the oscillation signal is thus determined. If the phase of the detected signal is opposite phase, the characteristic of the electro-optic modulator 2 has been greatly changed, so that it is necessary to invert the polarity of the applied voltage of the modulation signal. Therefore, if the phase of the detected signal is opposite phase, the polarity switching control signal is supplied from the phase synchronizing detector 20 to the switch 15 in the control circuit 16. As a result, the polarity of the modulation signal supplied to the electro-optic modulator 2 is inverted, thus permitting stable control of the output light $L_1$ of electro-optic modulator 2.

When the switch 12 is closed and the laser beam intensity setting value is supplied from the system controller 25 to the D/A converter 23, the value is converted to an analog signal to be supplied through the adder 24 to the control circuit 16 for amplification for being supplied to the electro-optic modulator 2.

At this time, the laser beam $L_1$ thus has an intensity corresponding to the setting value.

The laser beam $L_1$ is partly led through the beam splitter 3 to the photo-electric transducing means 10 for transduction to an electrical signal. The detected signal is supplied through the amplifier 11 and the switch 12 in the control circuit 16 to the adder 13. The amplifier 11 is set to provide an output of the negative polarity. The adder 13 thus provides the difference between the setting value signal supplied from the D/A converter 23 through the adder 24 and the detected signal. The amplification degree of the amplifier 11 is set such that the level of the detected signal is lower than the level of the setting value signal.

When the intensity of laser beam $L_1$ is increased with a slight change in the characteristic of the electro-optic modulator 2, the detected signal provided from the photo-electric transducing means 10 is increased in amplitude and invertedly amplified in the amplifier 11 to be supplied to the adder 13. The difference signal detected from the adder 13 thus is reduced. Thus, the modulation signal supplied form the control circuit 16 to electro-optic modulator 2 is reduced to reduce the intensity of laser beam $L_1$ to the initial intensity.

On the other hand, if the intensity of laser beam $L_1$ is reduced with a change in the characteristic noted above, the detected signal provided from the photo-electric transducing means 10 is reduced in amplitude, so that the difference signal provided from the adder 13 is increased. The modulation signal supplied from the control circuit 16 to the electro-optic modulator 2 is thus increased, thus increasing the laser beam intensity to the initial intensity. In this way, the intensity of laser beam $L_1$ corresponding to the value set by the D/A converter 23 is stabilized by the system controller 25. It is thus possible to accurately set the laser beam intensity matched to the photosensitive characteristic of a photoresist used in the recording medium 8 or the like.

As has been described in the foregoing, according to the present invention a laser beam is modulated according to a reference oscillation signal using an electro-optic modulator, a detected signal is obtained from the modulated laser beam using a photo-electric transducing means, and the polarity of the modulation signal supplied to the electro-optic modulator is inverted if the phase of the detected signal is opposite to the phase of the reference oscillation signal. Thus, the electro-optic modulator is controllable at all time, so that its handling can be facilitated.

In addition a signal of a desired value is supplied from a system controller through a D/A converter to the electro-optic modulator as in the above embodiment, so that it is possible to realize stable and accurate control of the laser beam intensity such as to match the photosensitive characteristic of a photoresist or the like.

What is claimed is:

1. An optical modulation system comprising:
   an electro-optic modulator for modulating a laser beam in accordance with a modulation signal;
   photo-electric transducing means for transducing a modulated laser beam derived from said modulator to an electrical signal;
   an oscillator for generating an oscillation signal;
   a phase synchronizing detector supplied with said electrical signal and said oscillation signal for detecting whether the phase of said electrical signal is in-phase or of opposite phase with respect to the phase of said oscillation signal; and
   a control circuit having first and second means, said first means being supplied with said oscillation signal and an output of said photo-electric transducing means for providing a first modulation signal and a second modulation signal, said first and second modulation signals being opposite in phase, said second means being controlled by an output derived from said phase synchronizing detector to select one of said first and second modulation signals for connection to said modulator, whereby when the phase of said electrical signal is opposite in phase with respect to the phase of said oscillation signal, the other one of said first and second modulation signals is selected to be supplied to said modulator.

2. The optical modulation system according to claim 1, wherein said second means of said control circuit is constituted by a switch.

3. The optical modulation system according to claim 1, wherein said control circuit includes a switch connected to the output side of said photo-electric transducing means and said first means includes an adder connected between said switch and said second means, the electrical signal from said photo-electric transducing means being compared to an oscillation signal in said adder when said switch is closed.

4. The optical modulation system according to claim 1, wherein said first means of said control circuit is constituted by an amplifier for providing two signals having positive and negative polarities.

* * * * *